(12) United States Patent
Nozaki et al.

(10) Patent No.: US 7,883,221 B2
(45) Date of Patent: Feb. 8, 2011

(54) ELECTRONIC DEVICE

(75) Inventors: Hirotake Nozaki, Port Washington, NY (US); Nobuhiro Fujinawa, Yokohama (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 530 days.

(21) Appl. No.: 11/660,214

(22) PCT Filed: Sep. 1, 2005

(86) PCT No.: PCT/JP2005/016025
§ 371 (c)(1),
(2), (4) Date: Oct. 22, 2007

(87) PCT Pub. No.: WO2006/033222
PCT Pub. Date: Mar. 30, 2006

(65) Prior Publication Data
US 2008/0049192 A1    Feb. 28, 2008

(30) Foreign Application Priority Data
Sep. 21, 2004  (JP) ............................... 2004-273434

(51) Int. Cl.
*G03B 21/00*  (2006.01)
(52) U.S. Cl. ............................ 353/122; 353/31; 353/39; 353/71; 353/98; 353/99; 353/119; 345/1.1; 345/32; 345/169; 345/905; 345/158; 345/156; 345/166; 345/168; 345/173; 715/716; 715/718; 715/719; 715/730; 348/744; 348/751
(58) Field of Classification Search .................. 353/39, 353/122, 71, 119, 31, 98, 99; 345/1.1, 32, 345/169, 905, 158, 156, 166, 168, 173; 348/744, 348/751; 715/716, 718, 719, 730
See application file for complete search history.

(56) References Cited

U.S. PATENT DOCUMENTS

| 5,936,545 | A | 8/1999 | Tsumura |
| 6,489,934 | B1 * | 12/2002 | Klausner .................... 345/1.1 |
| 6,773,114 | B2 * | 8/2004 | Pienimaa et al. .............. 353/71 |

(Continued)

FOREIGN PATENT DOCUMENTS

CN    1356841 A    7/2002

(Continued)

OTHER PUBLICATIONS

Supplementary European Search Report issued in European Patent Application No. 05781343.8 on Sep. 28, 2010.

(Continued)

*Primary Examiner*—Georgia Y Epps
*Assistant Examiner*—Sultan Chowdhury
(74) *Attorney, Agent, or Firm*—Oliff & Berridge, PLC (57) ABSTRACT

A portable telephone device with incorporated projector 10 displays the contents of a received email upon a main liquid crystal display device 204 This portable telephone device with incorporated projector 10 projects the contents of the received email after having changed its vertical-horizontal ratio (its row-column ratio) so that the number of characters in the horizontal direction becomes greater, as compared to the display screen of the main liquid crystal display device 204, upon which the numbers of characters being displayed vertically and horizontally are equal.

9 Claims, 9 Drawing Sheets

U.S. PATENT DOCUMENTS

| | | | |
|---|---|---|---|
| 7,057,508 B2 * | 6/2006 | Banks et al. | 340/539.13 |
| 2001/0030711 A1 | 10/2001 | Saito | |
| 2002/0063855 A1 * | 5/2002 | Williams | 353/122 |
| 2002/0080090 A1 * | 6/2002 | Borgstom et al. | 345/1.1 |
| 2003/0083933 A1 * | 5/2003 | McAlear | 705/14 |
| 2003/0092470 A1 * | 5/2003 | Kurakane | 455/566 |
| 2007/0188472 A1 * | 8/2007 | Ghassabian | 345/169 |
| 2008/0048979 A1 * | 2/2008 | Ruttenberg | 345/158 |

FOREIGN PATENT DOCUMENTS

| | | |
|---|---|---|
| DE | 201 17 201 U1 | 10/2002 |
| EP | 1 217 499 A2 | 6/2002 |
| JP | A-05-333833 | 12/1993 |
| JP | A-09-322214 | 12/1997 |
| JP | A-10-333247 | 12/1998 |
| JP | A 2000-059853 | 2/2000 |
| JP | A 2000-236375 | 8/2000 |
| JP | A 2001-285747 | 10/2001 |
| JP | A-2001-313702 | 11/2001 |
| JP | A 2001-351125 | 12/2001 |
| JP | A 2002-077327 | 3/2002 |
| JP | A 2002-199060 | 7/2002 |
| JP | A-2003-235037 | 8/2003 |
| JP | A 2003-309638 | 10/2003 |
| JP | A 2004-503182 | 1/2004 |
| WO | WO 02/05518 A2 | 1/2002 |
| WO | WO 02/071777 A1 | 9/2002 |
| WO | WO 2004/023208 A1 | 3/2004 |

OTHER PUBLICATIONS

Office Action issued in Japanese Patent Application No. 2004-273434; issued Jul. 20, 2010; with English-language translation.
Japanese Office Action issued Oct. 5, 2010 in Japanese Application No. 2004-273434.

* cited by examiner

FIG. 9

ELECTRONIC DEVICE

TECHNICAL FIELD

The present invention relates to an electronic device incorporating a projector device which projects information such as text or the like.

BACKGROUND ART

An electronic device in which a projector is mounted in a compact device such as a portable telephone device or the like is known (refer to Patent Reference #1). This portable telephone device with incorporated projector described in Patent Reference #1 projects information upon the palm of the hand of a person engaging in a telephone conversation while he is conversing, or projects information upon a wall surface during a telephone conversation.

Patent Reference #1:
Japanese Laid-Open Patent Publication 2000-236375.

DISCLOSURE OF THE INVENTION

Problems to be Solved by the Invention

When text information such as an electronic mail document or the like which has been received by the device described in Patent Reference #1 is being projected, there is a fear that the contents which are being projected will become difficult to understand, by only being simply projected while being magnified and reduced in size. In other words, since nothing is disclosed in the reference about magnification and shrinkage, the document may become difficult to understand if the full text is not included in the projection range, or if the margins in the projection range are too large. Furthermore, when projecting information within a file attached to an electronic mail which has been received, or if there are a plurality of electronic mails which have been received, there is a fear that it will become difficult to understand the relationship between the received email or emails, and the projected contents. Even further, when performing display upon a display device and projection with the projector, it is troublesome to issue both a display command and a projection command.

Means for Solving the Problems

According to the first aspect of the present invention, an electronic device, comprises: a projector device that projects an image; a display device that displays data for display that has been generated from information including text; and a projection control unit that controls the projector device so as to project an image according to data for projection that has been generated so as to include at least the data for display, and the image includes the same information as information displayed by the display device.

According to the second aspect of the present invention, in the electronic device according to the first aspect, the projection control unit may also make the projector device project an image that includes more characters than characters that the display device displays at least in a direction in which the text runs.

According to the third aspect of the present invention, in the electronic device according to the first or the second aspect, it is desirable for a projection resolution of the projector device to be higher than a display resolution of the display device.

According to the fourth aspect of the present invention, in the electronic device according to any one of the first through the third aspect, the projection control unit may also determine a number of characters and a character size permitted for a projection image according to a number of characters included in the information, and makes the projector device project an image having the number of characters and the character size that have thus been determined.

According to the fifth aspect of the present invention, in the electronic device according to the fourth aspect, the projection control unit may also determine an upper limit to the permitted number of characters, and, if a number of characters included in the information is greater than the upper limit, makes the project or device project an image having the upper limit number of characters and the character size corresponding to the upper limit, and scroll contents of the projection image.

According to the sixth aspect of the present invention, an electronic device comprises: a projector device that projects an image; a display device that displays data for display that has been generated from information including text; and a control unit that performs control, according to a projection command, so as to make the display device display contents of a received email, and so as to make the projector device project an image that includes contents of a file that is attached to the received email that is being displayed.

According to the seventh aspect of the present invention, in the electronic device according to the sixth aspect, it would also be acceptable to include a changeover control unit that, according to a changeover command, sends a command to the control unit so as to make the display device display the contents of the file attached to the received email, and also to make the projector device project the contents of the received email.

According to the eighth aspect of the present invention, an electronic device comprises: a projector device that projects an image; a display device that displays data for display that has been generated from information including text; and a control unit that, according to a projection command, performs control so as to make the display device display a list of received emails, and so as to make the projector device project an image that includes contents of a received email selected from the received email list that is being displayed.

According to the ninth aspect of the present invention, an electronic device comprises: a projector device that projects an image; a display device that displays data for display that has been generated from information including text; and a projection control unit that, according to a received email display command, starts projection processing with the projector device.

It would also be acceptable to replace the above described projection control unit by a projection control means.

It would also be acceptable to replace the above described control unit by a control means.

ADVANTAGEOUS EFFECT OF THE INVENTION

With the electronic device of the present invention, it is possible to project text information in an easy to understand manner.

BEST MODE FOR CARRYING OUT THE INVENTION

Figure 1:
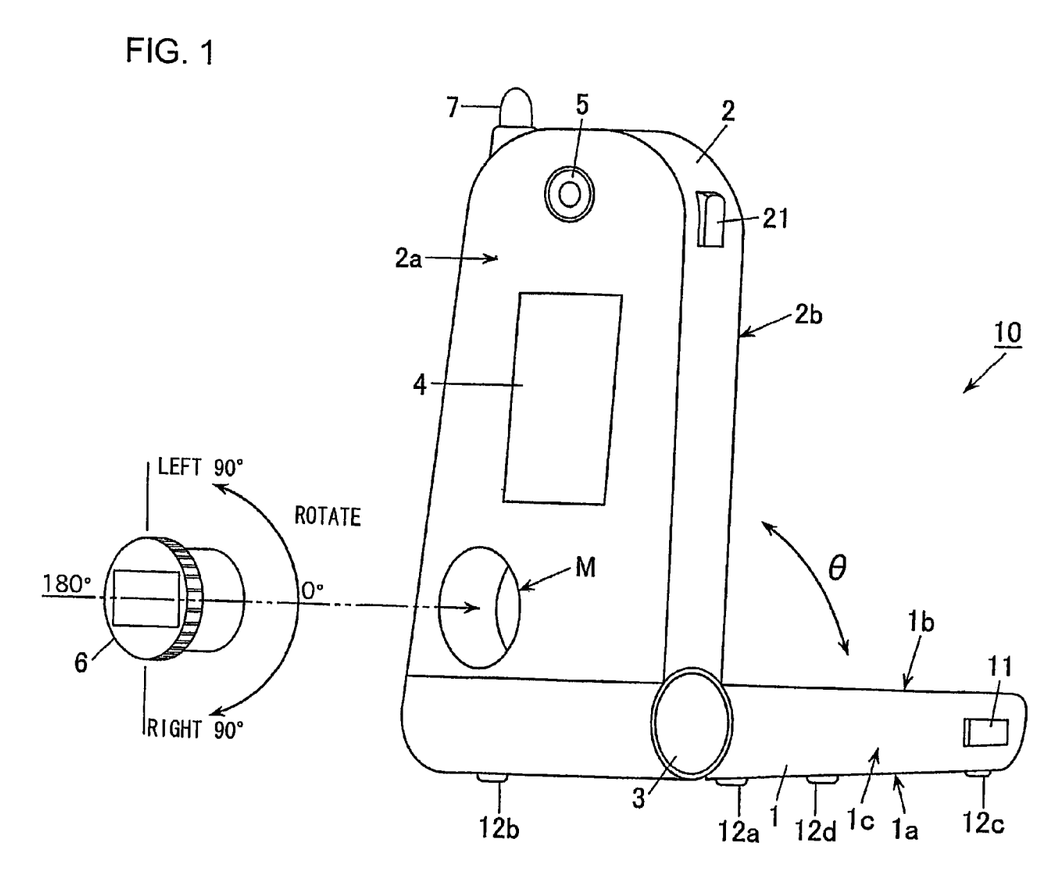
FIG. 1 is a perspective view of a portable telephone device with incorporated projector according to an embodiment of the present invention.

Preferred embodiments for implementation of the present invention will now be explained. FIG. 1 is a perspective view of a portable telephone device with incorporated projector 10 according to an embodiment of the present invention. In this portable telephone device with incorporated projector 10 of FIG. 1, a body comprising an actuation section 1 and a display section 2 is supported by a rotatable folding hinge unit 3, with this folding hinge unit 3 being adapted so as to fold freely by rotating about its center (form changeable). A click mechanism (not shown in the figures) is provided to the folding hinge unit 3, so that the relative angle θ between the actuation section 1 and the display section 2 can be positioned, for example, to a 80° position and to a 150° position. The 80° position corresponds to an attitude for projection by the projector unit, while the 150° position corresponds to an attitude for conversation with the telephone device.

Compact foot portions 12a-12d are provided to the bottom surface 1a of the actuation section 1, so as to stabilize this portable telephone device with incorporated projector 10 when it has been laid upon a planar surface. A first actuation member 112 and the like which will be described hereinafter are provided upon the surface 1b of the actuation section 1 on the side of the display section 2, and a compact foot portion 11 is provided upon a side 1c of the actuation section 1. This compact foot portion 11 is adapted so that, when the portable telephone device with incorporated projector 10 is laid upon a planar surface with the side 1c facing downwards (i.e. is laid in a horizontal position) in the state in which the relative angle θ of the portable telephone device with incorporated projector 10 has been opened up to 80° as shown in FIG. 1 (i.e. the projection attitude), then the telephone device with incorporated projector 10 is laid stably upon three points: this compact foot portion 11, and also the folding hinge unit 3 and a compact foot portion 21 which is provided upon the display section 2.

A main liquid crystal unit 204 which will be described hereinafter is disposed upon the surface 2b of the display section 2 on the side of the actuation section 1, and a sub liquid crystal display unit 4 is disposed upon the outside surface 2a of the display section 2. A photographic lens 5 of a camera and a projector module 6 are also both disposed upon the surface 2a of the display section 2. This projector module 6 is made in a cylindrical shape and fits into a round hole M which is provided upon the surface 2a of the display section 2 so as to rotate freely therein, with a click mechanism (not shown in the figures) being provided to click at a total of three spots: a fundamental position (taken as being 0°) shown in FIG. 1, and two positions in which the projector module 6 has been rotated at 90° from this fundamental position to orientations respectively on the left and the right with reference to that fundamental position.

Figure 2:
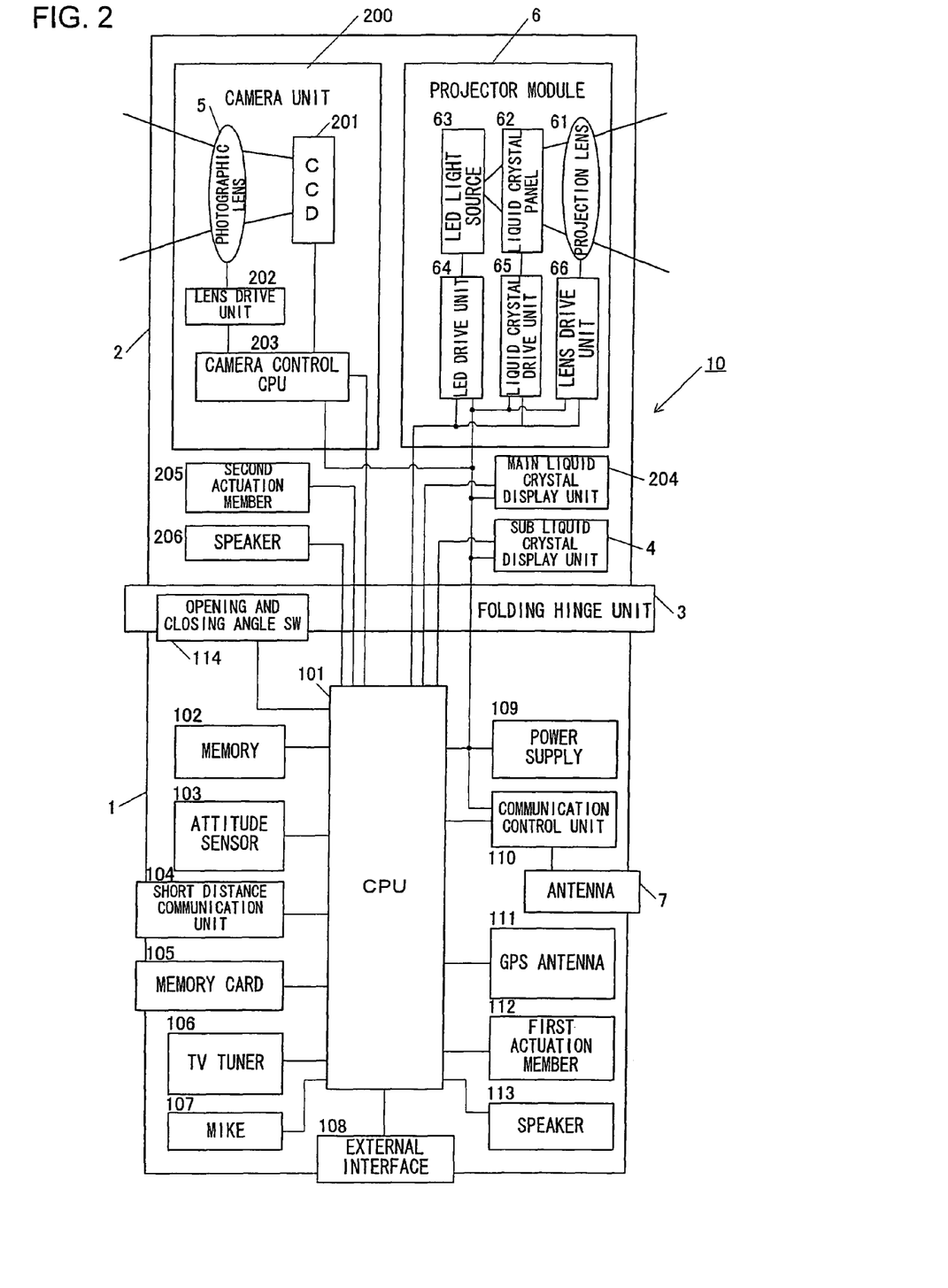
FIG. 2 is a block diagram for explanation of the structure of this portable telephone device with incorporated projector.

FIG. 2 is a block diagram for explanation of the structure of the portable telephone device with incorporated projector 10 of FIG. 1. In FIG. 2, on the side of the actuation section 1, there are provided a CPU 101, a memory 102, an attitude sensor 103, a short distance communication unit (circuit) 104, a TV tuner 106, a mike 107, an external interface (I/F) 108, a power supply 109, a communication control unit (circuit) 110, an antenna 7, a GPS antenna 111, the first actuation member 112, a speaker 113, and an opening and closing angle switch (SW) 114; and a removable memory card 105 is also implemented.

To the display section 2, there are provided a camera unit 200, the projector module 6 (the projector unit), a second actuation member 205, a speaker 206, the main liquid crystal unit 204, and the sub liquid crystal unit 4.

Based upon a control program, the CPU 101 performs predetermined calculation and the like using signal inputted from various units incorporated in this portable telephone device with incorporated projector 10, and controls each of telephone device operation, camera operation, and projector operation by sending control signals to various units of this portable telephone device with incorporated projector 10. It should be understood that this control program is stored in a non-volatile memory (not shown in the figures) within the CPU 101.

The memory 102 is used as a working area for the CPU 101. The attitude sensor 103 detects the attitude of this portable telephone device with incorporated projector 10, and sends its detection signal to the CPU 101. Due to this, the CPU 101 acquires top and bottom information which specifies the top and the bottom of an image during photography (including information for identifying photography with the camera in the vertical position and photography with the camera in the horizontal position), and, when the projector is being used, decides whether it is in a state of being mounted in a vertical position as shown in FIG. 1, or is in a state of being mounted in the above described horizontal position.

The short distance communication unit 104 may comprise, for example, an infrared radiation communication circuit, and transmits and receives data to and from an external device upon command by the CPU 101. The TV tuner 106 receives a television broadcast upon command by the CPU 101. The CPU 101 displays the received image upon the main liquid crystal display unit 204, and replays the received audio upon the speaker 206. The memory card 105 comprises a non-volatile memory, and, upon command by the CPU 101, it is possible to write, store, and read out data such as, for example, image data outputted by the camera unit 200, images and audio data outputted by the TV tuner 106, and the like.

The mike 107 converts audio which has been captured into an electrical signal and sends it to the CPU 101 as an audio signal. This audio signal is recorded in the memory card 105 during sound recording, and is sent to the communication control unit 110 during conversation. The external interface 108 transmits and receives data to and from an external device via a cable or a cradle, not shown in the figures, upon command by the CPU 101.

The speaker 113 replays the audio of an audio signal outputted from the CPU 101. The first actuation member 112 includes dial buttons for a telephone device and the like, and sends actuation signals to the CPU 101 corresponding to the buttons which are pressed. The GPS antenna 111 receives signals from GPS satellites, and sends the received data to the CPU 101. The CPU 101 is adapted to be able to calculate positional information using this data received from the GPS antenna 111. The communication control unit 110 includes a wireless transmission and reception circuit, and performs communication with other telephone devices via a base station not shown in the figures, upon command by the CPU 101. This communication control unit 110 is adapted so as to be able to transmit and receive, not only telephone audio, but also image data which has been photographed by the camera unit 200, image data for projection by the projector module 6, and the like. And the antenna 7 is a transmission and reception antenna for the communication control unit 110.

The power supply 109 may consist of, for example, a removable battery pack and a DC/DC conversion circuit or the like, and supplies the various sections within the portable telephone device with incorporated projector 10 with the electrical power which they require. The opening and closing angle SW 114 detects the rotational angle of the folding hinge unit 3, and sends an ON signal (H level) to the CPU 101 if it detects that the relative angle θ between the actuation section 1 and the display section 2 is 80° (the projection attitude), while it sends an OFF signal (L level) for any other than the angle described above.

The main liquid crystal display unit 204 displays information such as an image or text or the like upon a command from the CPU 101. The sub liquid crystal display unit 4 also displays information such as an image or text or the like upon a command from the CPU 101. The second actuation member 205 includes a button or the like which is related to the displayed contents upon the main liquid crystal display unit 204, and sends an actuation signal to the CPU 101 according to this button being depressed. And the speaker 206 replays audio which is outputted from the CPU 101 as a sound signal, during the conversation attitude when the relative angle θ is 150°.

The camera unit 200 comprises the photographic lens 5, an image sensor 201, a lens drive unit 202, and a camera control CPU 203. As the image sensor 201, a CCD or CMOS photographic element or the like may be used. The camera control CPU 203 drives and controls the image sensor 201 and the lens drive unit 202 upon a command from the CPU 101. Upon receipt of a zoom control signal from the camera control CPU 203, the lens drive unit 202 drives a zoom lens (not shown in the figures) which is incorporated in the photographic lens 5 to a tele side or to a wide side. The photographic lens 5 images an image of the object to be photographed upon the photographic surface of the image sensor 201. The camera control CPU 203 starts this photography upon the image sensor 201, and, after the end of photography, reads out an accumulated electric charge signal from the image sensor 201, and, after having performed predetermined signal processing thereupon, sends it to the CPU 101 as image data. It should be understood that, when image data which has been photographed by the camera unit 200 is to be transmitted, image data is sent from the CPU 101 to the communication control unit 110. Furthermore, when a photographic image is to be projected, image data is sent from the camera control CPU 203 via the CPU 101 to the projector module 6. In the CPU 101, which is an image processing circuit, trapezoidal deformation correction processing is performed upon the image data to be projected by the projector module 6.

The projector module 6 comprises a projection lens 61, a liquid crystal panel 62, a LED light source 63, a LED drive unit (circuit) 64, a liquid crystal drive unit (circuit) 65, and a lens drive unit (circuit) 66. The LED drive unit 64 supplies electrical current to the LED light source 63 according to a LED drive signal which is outputted from the CPU 101. And the LED light source 63 illuminates the liquid crystal panel 62 at a brightness corresponding to the electrical current which is supplied.

The liquid crystal drive unit 65 generates a liquid crystal panel drive signal corresponding to the image data, and, by using this generated drive signal, drives the liquid crystal panel 62. In concrete terms, in the liquid crystal layer, a voltage is applied to each of the picture elements in correspondence to the image signal. The arrangement of the liquid crystal molecules changes in the liquid crystal layer to which voltage has thus been applied, and the optical transitivity of this liquid crystal layer changes. By modulating the light from the LED light source 63 in this manner according to the image signal, the liquid crystal panel 62 creates an optical image. The liquid crystal panel 62 has a resolution in which it can display 18 lines×30 columns on one screen, when one character (a full size character) consists of 12 dots×12 dots. This resolution is higher than the display resolution of the main liquid crystal display device 204.

The lens drive unit 66 drives the projection lens 61 forwards and backwards along a direction orthogonal to the optical axis, based upon a control signal outputted from the CPU 101. And the projection lens 61 projects an optical image emitted from the liquid crystal panel 62 towards a screen or the like.

Figure 3:
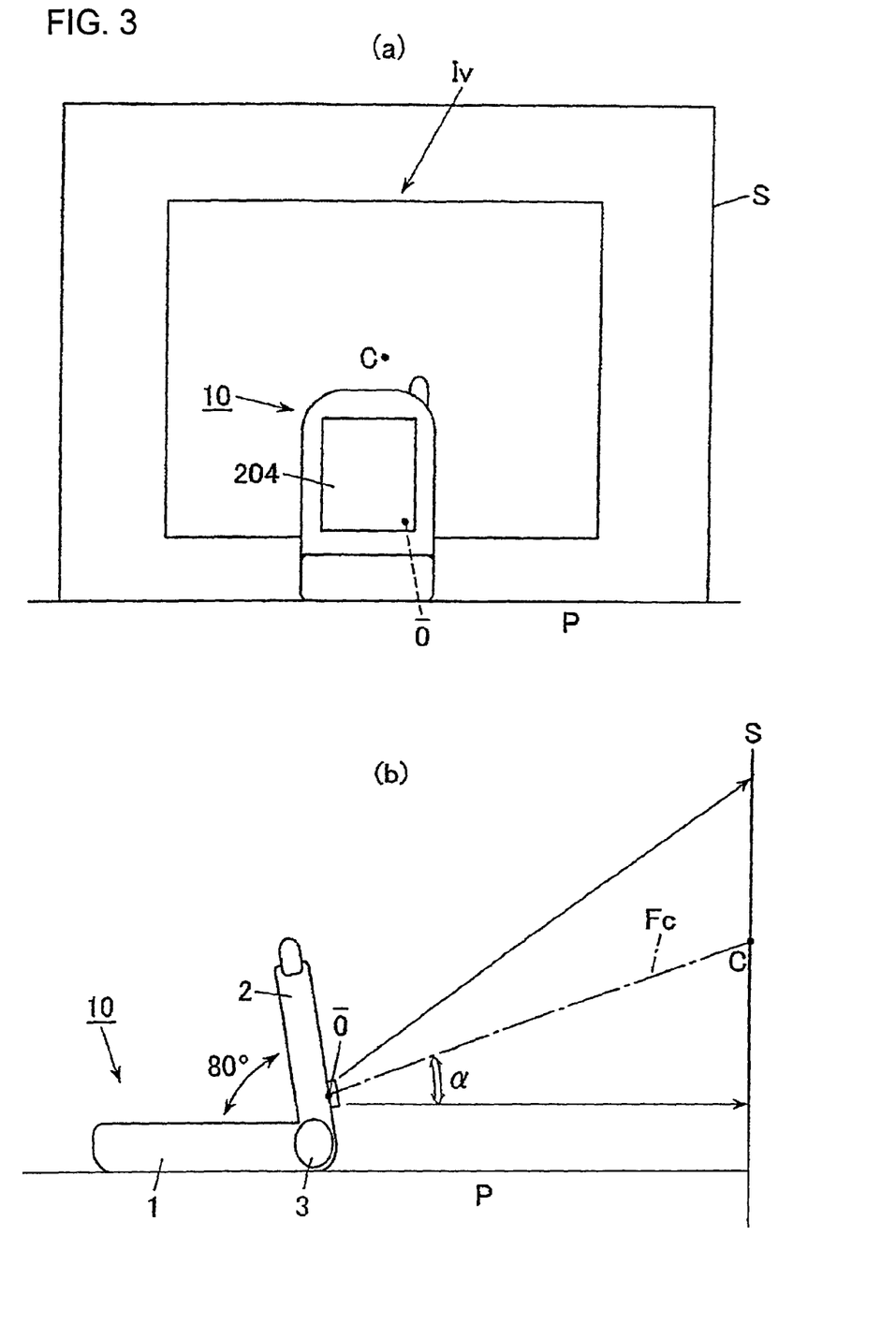
FIG. 3 is a figure for explanation of the image projected by this portable telephone device with incorporated projector: (a) is a figure showing the screen as seen in a straight on orientation, while (b) is a figure showing the screen as seen from its right side.

The details of the image projected by the projector module 6 will now be explained. When, with this portable telephone device with incorporated projector 10, the relative angle θ between its actuation section 1 and its display section 2 is set to the projection attitude of 80°, so that the operation of the projector module 6 is permitted, then projection is performed. FIG. 3 is a figure for explanation of the image Iv which is projected upon a screen S from the portable telephone device with incorporated projector 10 which has been mounted upon a plane P in the vertical position described above. FIG. 3(a) is a figure showing the screen S as seen in a straight on orientation, while FIG. 3(b) is a figure showing the screen S as seen from its right side. In FIG. 3(a), the central point C of the projection light flux of the projection image Iv is offset in the upwards direction from the center O of the aperture of the projector module 6. In other words, as shown in FIG. 3(b), by the center line Fc of the projection light flux being adjusted to a projection angle α with respect to a surface parallel to the plane P, the lower edge of the projection light flux is oriented to be parallel or above the plane P. It should be understood that the rotational position of the projector module 6 is set to 0°. Furthermore, the point C in the figure denotes the center of the light flux which is being projected (the center of the projection image Iv), and the line which connects the center O of the aperture and the point C corresponds to the center line Fc of the above described light flux.

Although the offset of the projection image is obtained by the above described projection angle α, the projection image in this state without alteration would be trapezoidal in shape, which would be undesirable. Accordingly, a perspective correction effect is obtained by the above described shifting of the projection lens by the lens drive unit 66, and, corresponding to this perspective correction effect, the projection image IV is corrected to a square shape by performing keystone correction (trapezoidal deformation correction) upon the display data which is projected. With regard to the lens shift amount and the keystone correction amount, initial correction values for correcting the projection image Iv to a square shape in the state of the above described projection attitude are stored in advance within the CPU 101.

Figure 4:
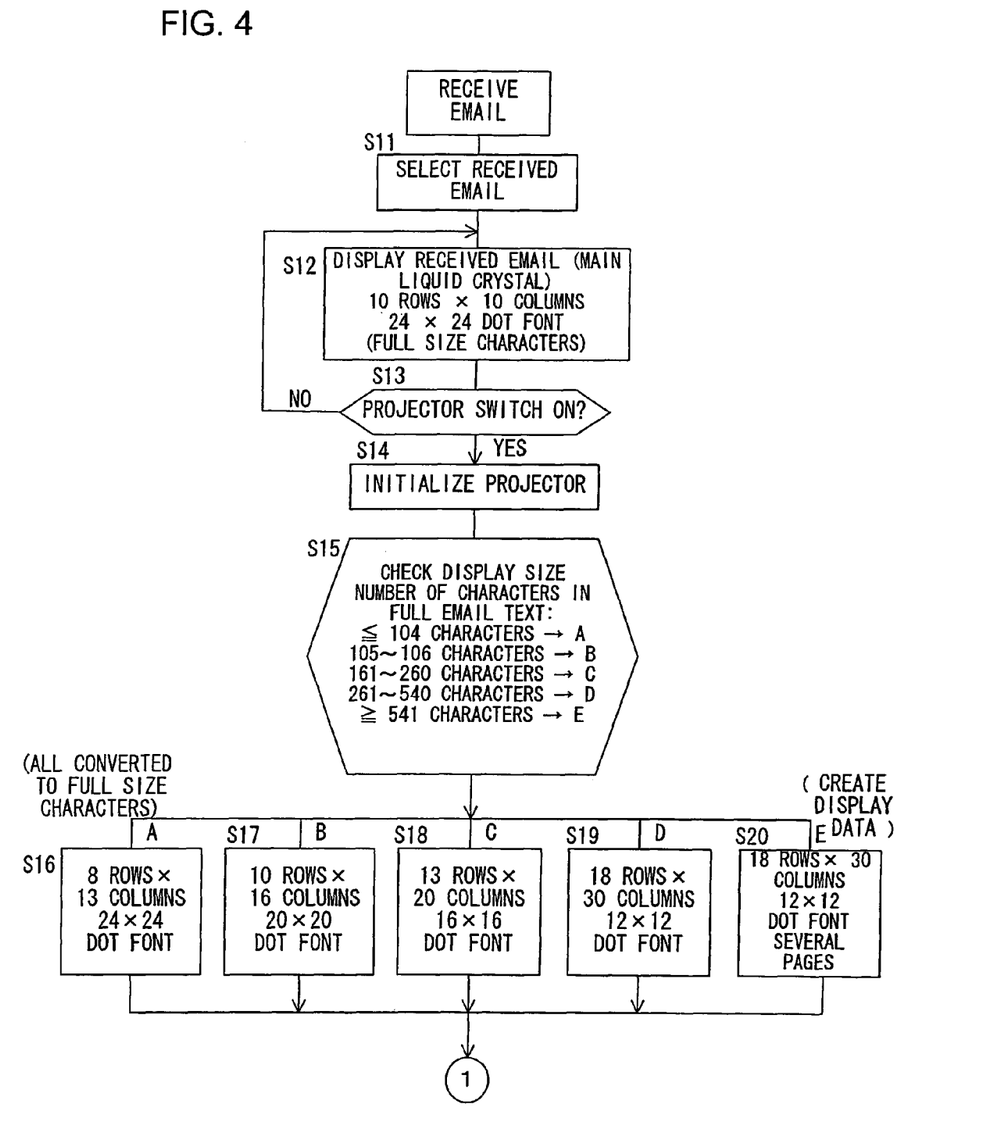
FIG. 4 is a flow chart for explanation of the flow of a projector control procedure performed by a CPU.
Figure 5:
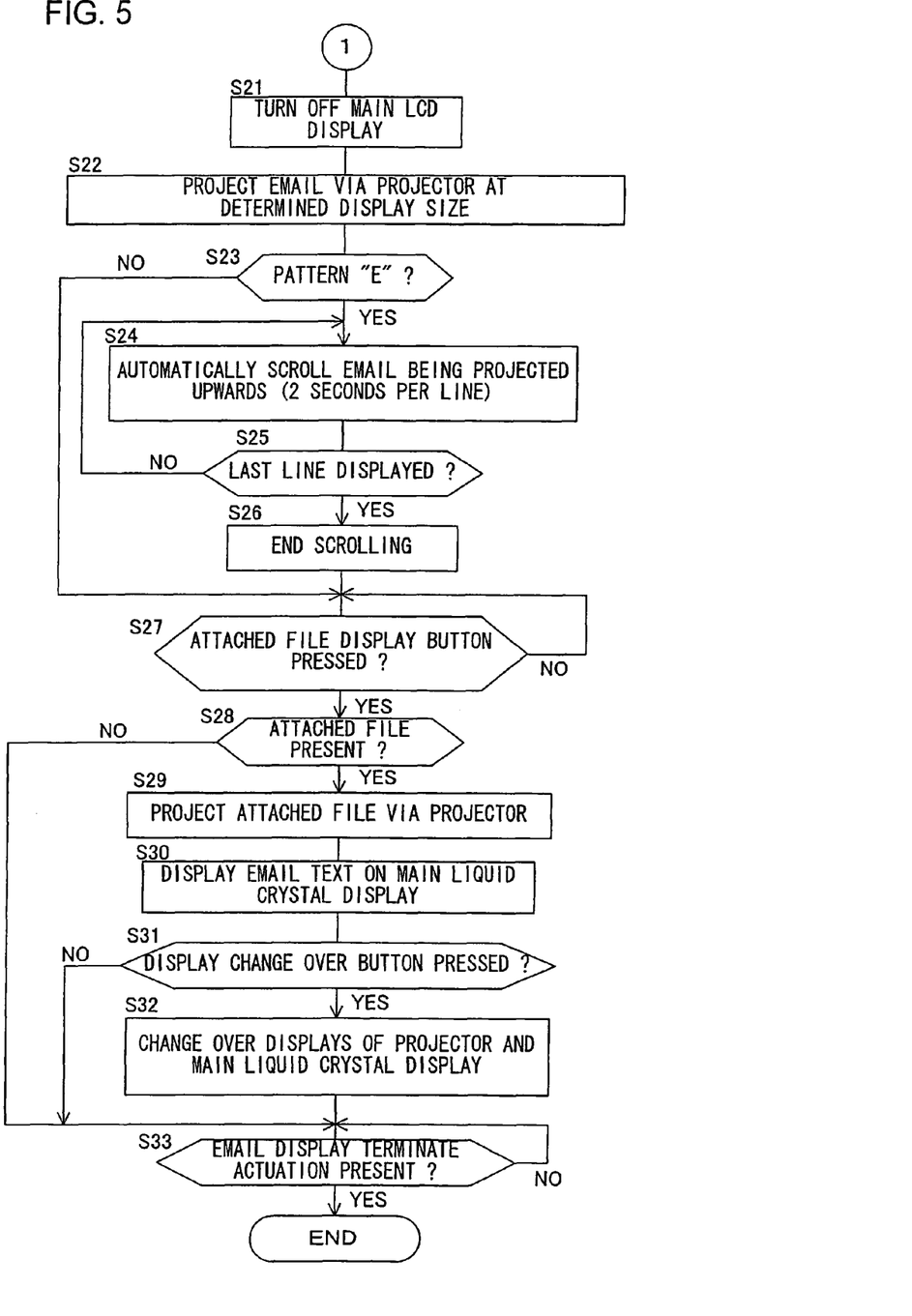
FIG. 5 is a flow chart for explanation of this flow of the projector control procedure performed by the CPU.

The present invention is particularly distinguished by its operation when the above described portable telephone device with incorporated projector 10 is receiving electronic mail. FIGS. 4 and 5 are flow charts for explanation of the flow of a projector control procedure performed by the CPU 101. The processing according to FIG. 4 is started when the portable telephone device with incorporated projector 10 receives an email. In a step S11 of FIG. 4, the CPU 101 selects the most recently received email from an email list which is stored in a received email folder, and then proceeds to a step S12. This received email folder, for example, may be allocated to a predetermined region within a non-volatile memory within the CPU, not shown in the figures.

In the step S12, the CPU 101 displays the contents of the selected received email upon the main liquid crystal display device 204, and then proceeds to a step S13. Here, the display resolution of the main liquid crystal display device 204 is 320 dots vertically×240 dots horizontally, and its character display range is 240 dots vertically×240 dots horizontally, so that, when displaying full size characters of 24 dots×24 dots each, one screen consists of 10 rows×10 columns of characters. The CPU 101 creates display data for displaying the text of the received email, and sends this display data which has been created to the main liquid crystal display device 204.

In the step S13, the CPU 101 makes a decision as to whether or not a projection switch of the projector module 6 is ON. If an actuation signal which indicates that projection is ON is being inputted from the first actuation member 112, then the CPU 101 makes an affirmative decision in the step S13 and proceeds to a step S14, whereas, if an actuation signal which indicates that projection is OFF is being inputted, then the CPU makes a negative decision in the step S13 and returns to the step S12. If the flow of control returns to the step S12, then the contents of the received email are only displayed upon the main liquid crystal display device 204, and the flow of control does not proceed to processing for projection with the projector module 6.

In the step S14, the CPU 101 performs initial setting of the projector module 6, and then proceeds to a step S15. This initial setting includes initialization of the liquid crystal drive unit 65, causing the lens drive unit 66 to perform lens shifting according to the above described initial correction value, and keeping the LED light source 63 OFF.

In the step S15, the CPU 101 performs determination processing of the display size (the number of characters projected). And the CPU 110 determines upon the size for the display, as described in the following, according to the number of characters in the full text of the received email which has been selected as described above, and then the flow of control proceeds to a step S21 of FIG. 5.

A. If the number of characters is less than or equal to 104, then the flow of control is transferred to the step S16, and one full-size character is written as 24 dots×24 dots, with 8 rows by 13 columns upon one screen.

B. If the number of characters is 105~160, then the flow of control is transferred to the step S17, and one full-size character is written as 20 dots×20 dots, with 10 rows by 16 columns upon one screen.

C. If the number of characters is 161~260, then the flow of control is transferred to the step S18, and one full-size character is written as 16 dots×16 dots, with 13 rows by 20 columns upon one screen.

D. If the number of characters is 261~540, then the flow of control is transferred to the step S19, and one full-size character is written as 12 dots×12 dots, with 18 rows by 30 columns upon one screen.

E. If the number of characters is greater than or equal to 541, then the flow of control is transferred to the step S20, and one full-size character is written as 12 dots×12 dots, with 18 rows by 30 columns upon one screen; and also a plurality of screens (pages) are employed.

In the step S21 of FIG. 5, the CPU 101 turns the display of the main liquid crystal display device 204 to OFF (turns it off), and then proceeds to a step S22. In this step S22, the CPU 101 makes the projector module 6 project the contents of the received email with the display size (the number of characters projected) which has been determined as described above, and then proceeds to a step S23. In concrete terms, a command and data for projection are sent to the liquid crystal drive unit 65 so as to create the email text upon the liquid crystal panel 62 in the above described projection number of characters, and a command is sent to the LED drive unit 64 to turn the LED light source 63 ON. Due to this, the text of the email is projected by the projector module 6 upon a landscape format (horizontally long) screen (in which the number of columns is greater than the number of rows). It should be understood that, if the text of the email is to be projected as written horizontally (i.e. with the text running horizontally), then a landscape format screen is employed; whereas, if the text of the email is to be projected as written vertically (i.e. with the text running vertically), then this will be easier to read, if a portrait format (vertically long) screen (with the number of rows greater than the number of columns) is employed.

Figure 6:
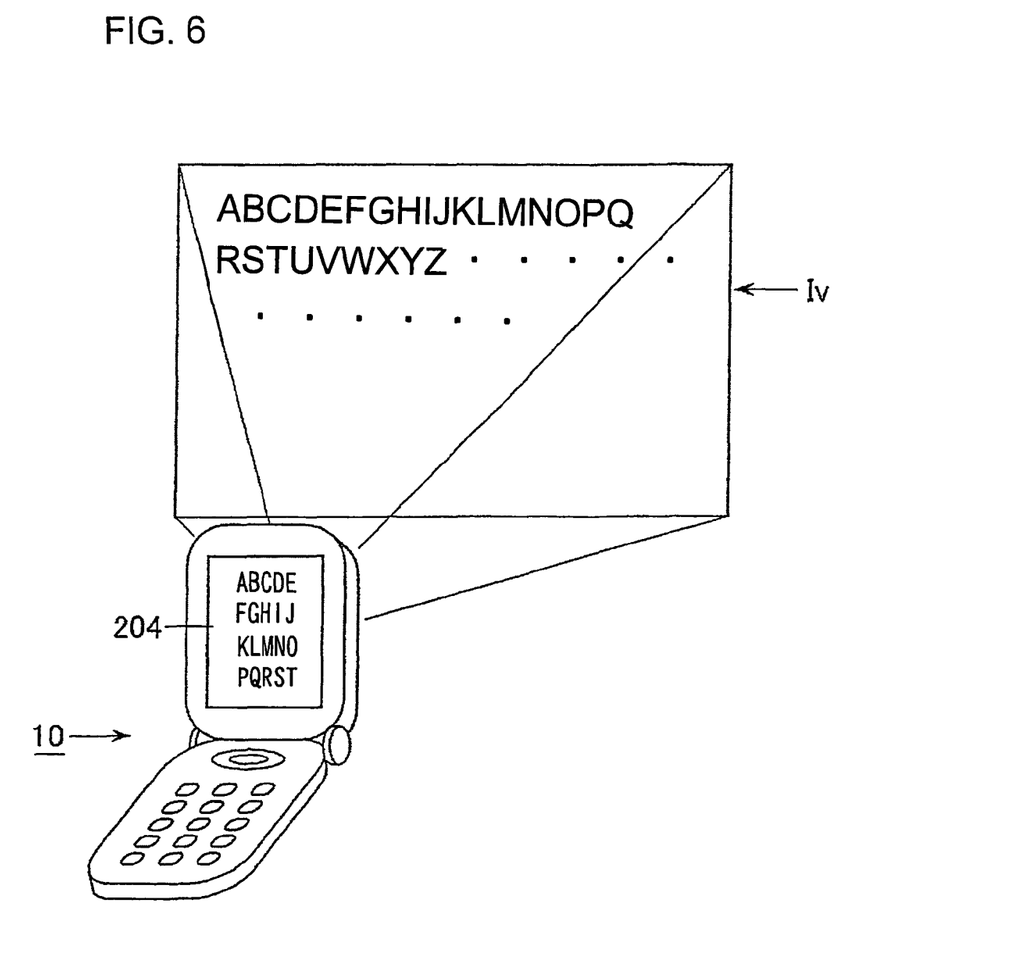
FIG. 6 is a figure for explanation of the contents of an image projected by the projector module, and the contents displayed by a main liquid crystal display device.

FIG. 6 is a figure for explanation of the contents of the image Iv projected by the projector module, and of the contents displayed upon the main liquid crystal display device 204. As compared to the screen of the main liquid crystal display device 204 upon which the number of characters displayed vertically and horizontally is equal (10×10), in the projection image Iv, the vertical to horizontal ratio (the row/column ratio) is changed, so that the number of characters in the horizontal direction becomes the greater. It should be understood that, since the main liquid crystal display device 204 is turned off before projecting the text of the email, accordingly display and projection of the text of the email are not actually performed at the same time.

In the step S23, the CPU 101 decides whether the pattern is "E" or not. If the display size determined by the CPU 101 in the step S15 was "E" as described above, then an affirmative decision is made in this step S23 and the flow of control proceeds to the step S24, while if the display size was any one of "A" through "D" described above, then a negative decision is made in this step S23 and the flow of control proceeds to the step S27.

In the step S24, the CPU 101 scrolls the email contents being projected in the upwards direction, and then proceeds to the step S25. The speed of scrolling may be, for example, one row in 2 seconds.

Figure 7:
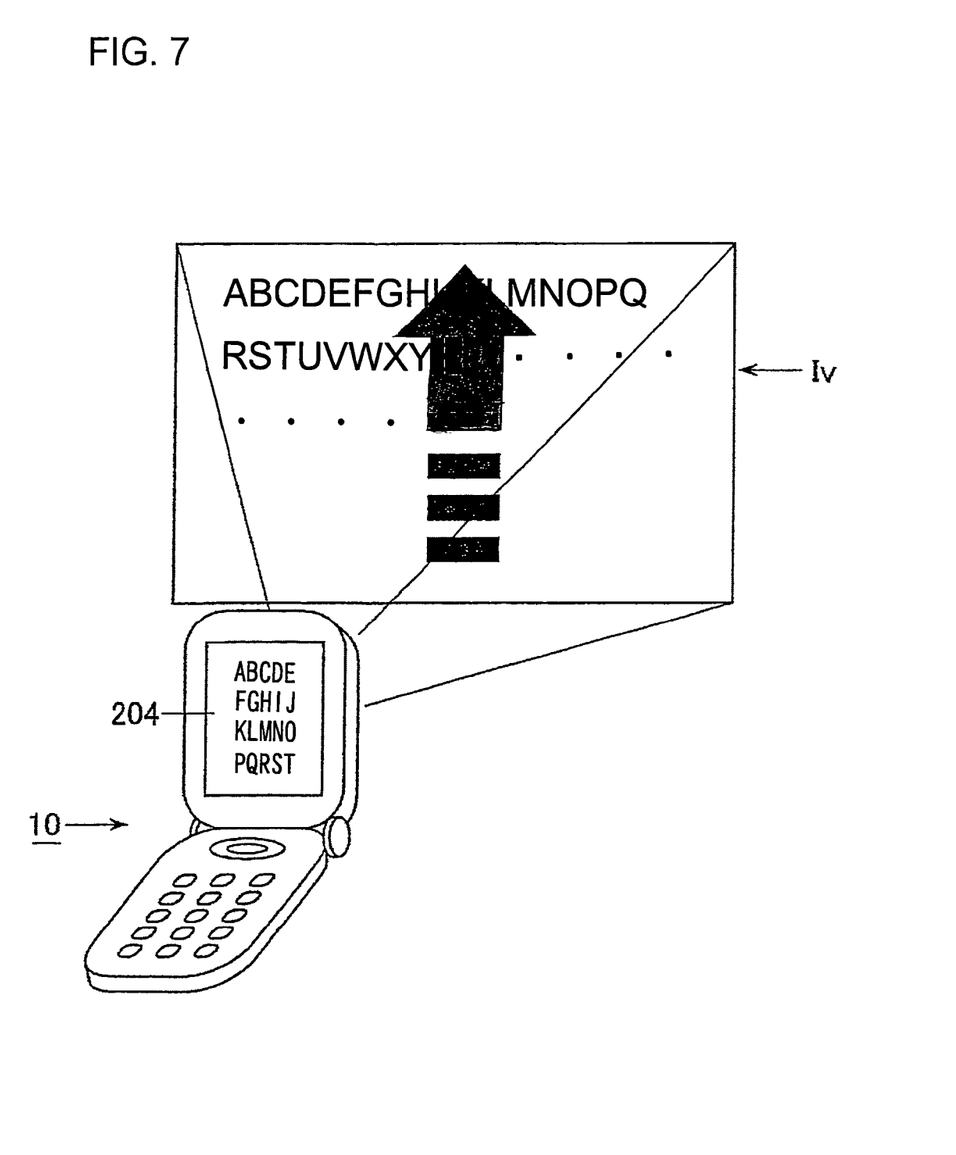
FIG. 7 is a figure for explanation of the contents of an image projected by the projector module, and the contents displayed by a main liquid crystal display device.

FIG. 7 is a figure for explanation of the contents of the image Iv projected by the projector module 6, and the contents displayed upon the main liquid crystal display device 204. In the projection image Iv, the text of the email is gradually scrolled in the upwards direction. It should be understood that, since the main liquid crystal display device 204 is turned off before projecting the text of the email, accordingly display and projection of the text of the email are not actually performed at the same time.

In the step S25, the CPU 101 decides whether or not the scrolling has ended. If the CPU 101 has performed scrolling until all of the last page of the plurality of pages has been displayed, then an affirmative decision is made in this step S25 and the flow of control proceeds to a step S26, while if scrolling has not yet proceeded as far as displaying all of the final page, then a negative decision is made in this step S25, and the flow of control returns to the step S24. In the case of a return to the step S24, the scrolling is continued.

In the step S26, the CPU 101 stops scrolling the display contents of the main liquid crystal display device 204, and proceeds to the step S27.

In the step S27, the CPU 101 decides whether or not a "display attached file" button has been depressed. I.e., the CPU 101 decides whether or not this button, which causes a file attached to the email which is being displayed to be displayed, is depressed or not. If an actuation signal for showing that an attached file is to be displayed has been inputted from the first actuation member 112, then the CPU 101 makes an affirmative decision in this step S27 and proceeds to the step S28, while if no such actuation signal for showing that an attached file is to be displayed is being inputted, then the CPU 101 makes a negative decision in this step S27 and repeat this decision processing. This actuation signal which shows that an attached file is to be displayed corresponds to a projection command to the projector module 6.

In the step S28, the CPU 101 makes a decision as to whether or not any attached file is present. If a file is attached to the email which is being displayed, then the CPU 101 reaches an affirmative decision in this step S28 and proceeds to a step S29, whereas if no file is attached to the email which is being displayed, then it reaches a negative decision in this step S28 and proceeds to a step S33.

In the step S29, the CPU 101 projects the contents of the attached file via the projector module 6, and then proceeds to a step S30. In this step S30, the CPU displays the text of the email upon the main liquid crystal display device 204 again, and then proceeds to a step S31. The size of this display upon the main liquid crystal display device 204, as described above, is 24 dots×24 dots for each single full size character, and 10 rows×10 columns per each screen.

Figure 8:
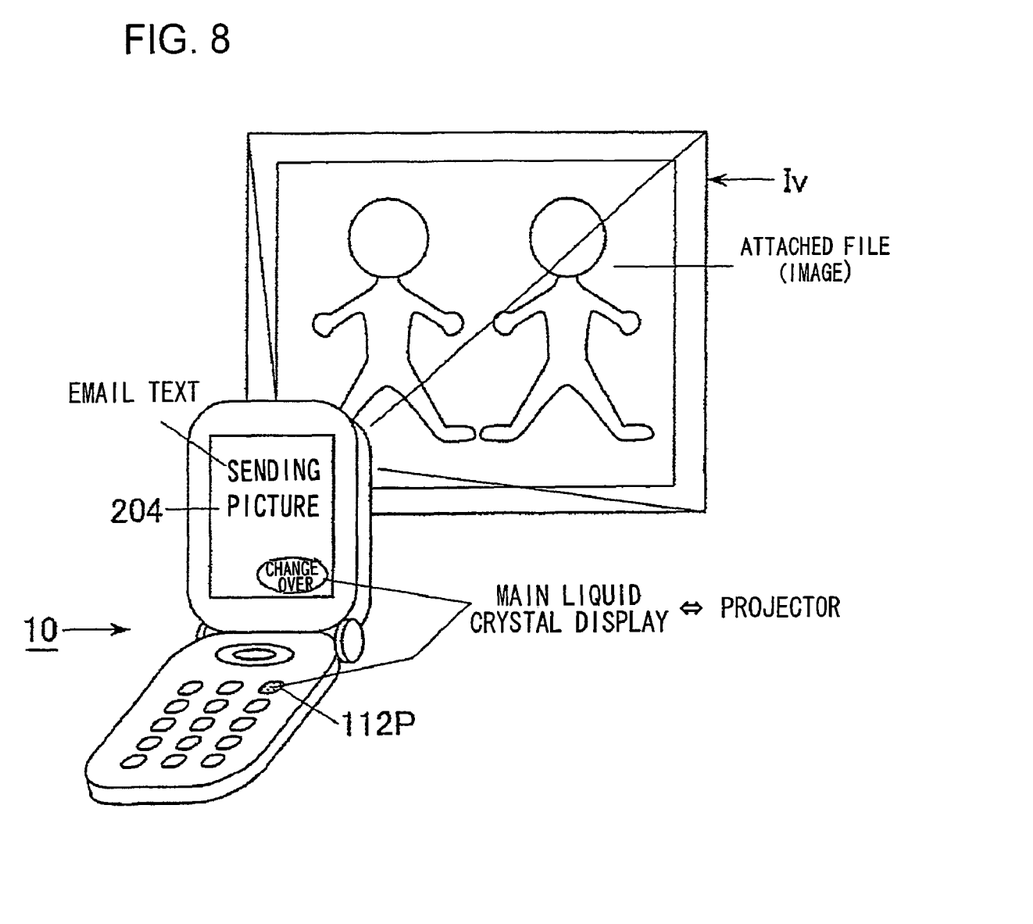
FIG. 8 is a figure for explanation of the contents of an image projected by the projector module, and the contents displayed by a main liquid crystal display device.

FIG. 8 is a figure for explanation of the contents of the image Iv projected by the projector module 6, and the contents displayed upon the main liquid crystal display device 204. The text of the email is displayed upon the screen of the main liquid crystal display device 204, while an image replayed from the attached file (if the attached file is an image file) is projected (the projection image Iv). Here, the menu "change over" is displayed upon the lower portion of the screen of the main liquid crystal display device 204, and, in this state, among the first actuation members 112, the actuation button 112p which is closest to the display "change over" described above is treated as a "display change over" button.

In the step S31, the CPU 101 decides whether or not this "display change over" button has been depressed. If an actuation signal corresponding to the actuation button 112p is being inputted, then the CPU 101 makes an affirmative decision in this step S31 and proceeds to the step S32, while if an actuation signal corresponding to the actuation button 112p is not being inputted then it makes a negative decision in this step S31 and proceeds to a step S33.

In the step S32, the CPU 101 changes over the contents being projected by the projector module 6 and the contents being displayed by the main liquid crystal display device 204, and then proceeds to the step S33. In this step S33, the CPU 101 decides whether or not actuation is being performed to terminate display of email. If an actuation signal is being inputted from the first actuation member 112 for termination, then the CPU 101 makes an affirmative decision in this step S33 and terminates the processing of FIG. 5, while if a termination actuation signal is not being inputted then it makes a negative decision in this step S31 and repeats this decision processing.

According to the embodiment explained above, the following operation and beneficial effects are available.

(1) The portable telephone device with incorporated projector 10 displays the contents of email which has been received upon the main liquid crystal display device 204. If the projection switch of the projector module 6 is ON, then, instead of being displayed upon the main liquid crystal display device 204, this is projected by the projector module 6. Since during projection by the projector module 6 the display of the main liquid crystal display device 204 is turned OFF (in the step S21), accordingly duplicated contents are not projected simultaneously, so that there is no useless consumption of electrical power.

(2) Since, to the projector module 6 of the portable telephone device with incorporated projector 10, there is provided the liquid crystal panel 62 which projects a larger number of characters as compared to the display screen of the main liquid crystal device 204 upon which the number of characters displayed vertically and horizontally is 10×10, accordingly a higher projection resolution is obtained than the display resolution of the main liquid crystal display device 204. Due to this, it is possible to provide a large amount of information upon one screen of projection image.

(3) In addition to (2) described above, this portable telephone device with incorporated projector 10 is arranged to project (in the step S22) the contents of a received email after having changed (in the steps S15 through S20) the vertical to horizontal ratio (the row-column ratio) so that the number of characters in the horizontal direction becomes greater, as compared to the display screen of the main liquid crystal device 204 upon which the number of characters displayed vertically and horizontally is 10×10. By increasing the number of characters in one line, it is possible to enhance the recognizability of the text of the email in the projection image. Particularly, by making the number of characters in the horizontal direction larger in the case of a landscape display, it is possible to reduce the number of line feeds, so that it is possible to reduce the likelihood of a phrase being interrupted partway through.

(4) Since it is arranged to determine the vertical to horizontal ratio (the row-column ratio) at any of the four levels "A" through "D", according to the number of characters in the full text of the received email, accordingly the characters are projected while using the entire projection screen in an effective manner. As a result it no longer happens that, for example, the characters are projected while being biased to one region only of the projection screen, with a large empty white region appearing, and thereby it is possible to enhance the recognizability of the text of the email in the projected image.

(5) The upper limit for the number of characters per one screen is determined as being 540 characters, in the case "D" described above, and, if the number of characters of the full text of the received email is greater than 540 characters, then, after setting the number of characters per one screen to 540 characters, it is arranged to display the email with a plurality of pages (in the step S20). Due to this, it is possible to prevent the characters in the projection image from becoming too small, and the recognizability of the text of the email from deteriorating.

(6) Since, in the case of the pattern "E", it was arranged to scroll the projection image at a speed of one line per two seconds (in the step S24), accordingly the convenience of use is enhanced, since it becomes unnecessary to perform actuation for changing over the projected page.

(7) If a file is attached to the email which is being projected by the projector module 6, then the contents of this attached file are projected via the projector 6 (in the step S29), and the text of the email is displayed on the main liquid crystal display device 204 again (in the step S30). Accordingly, if an image data file is attached, then the replay image due to this attached file can be consulted as a projection image at a higher detail than the display screen of the main liquid crystal display device 204.

(8) Since if, in the above described state (7), the "change over display" button is depressed, then the contents being projected by the projector module 6 and the contents being displayed by the main liquid crystal display device 204 are interchanged, accordingly this is effective if the user becomes desirous of projecting the text of the email, while the replay image due to the attached file is being projected.

Variant Embodiment #1

Figure 9:
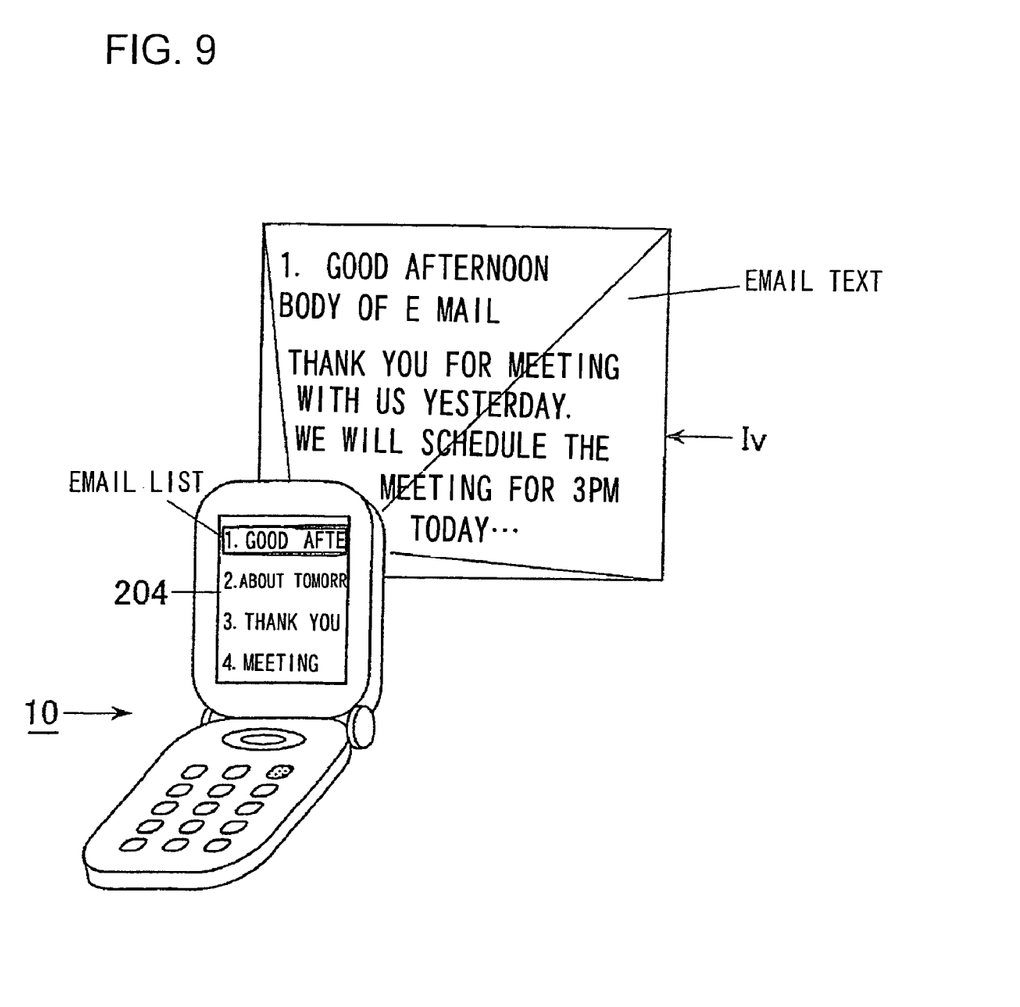
FIG. 9 is a figure for explanation of the contents of an image projected by the projector module, and the contents displayed by a main liquid crystal display device.

Although, in the example described above, it was arranged to select (in the step S11) the most recently received email from the email list stored in the received email folder as a subject for display (or projection), a structure would also be acceptable in which it was possible for the user to select from the email list. FIG. 9 is a figure for explanation of the contents of the image Iv projected by the projector module 6, and the contents displayed upon the main liquid crystal display device 204. An email list (a list display) is displayed upon the screen of the main liquid crystal display device 204, and the contents of that email which has been selected from this email list are projected (the projection image Iv). Here, when the first actuation member 112 is actuated and an actuation signal for selecting a different email has been inputted, the CPU reads out the contents of the corresponding email from the received email folder and projects them via the projector module 6. The actuation signal for selecting this different email corresponds to a projection command to the projector module 6.

Variant Embodiment #2

Although, in the above explanation, it was arranged for the flow of control to proceed to the projection processing according to a projection command (the switch being ON) to the projector module 6 (an affirmative decision in the step S13), it would also be acceptable to arrange to proceed without fail to the projection processing when an email has been received.

Variant Embodiment #3

Furthermore, it would also be acceptable to arrange to proceed to the projection processing automatically when a command has been issued (in the step S12) to perform display related to a received email upon the main liquid crystal display device 204. In this case, it is possible to omit the projection command to the projector module 6 (turning the switch ON), so that the convenience of use is enhanced.

It should be understood that it would also be acceptable to perform the setting of whether or not to command the projector module 6 to perform projection by providing a dedicated projector ON/OFF switch; or it would also be acceptable to arrange to set this ON/OFF with a menu setting.

Variant Embodiment #4

Since it is possible for the projector module 6 to project a larger amount of information than can be displayed upon the main liquid crystal display device 204, accordingly it would also be acceptable to arrange for an email list (a list display) to be projected with the projector module 6. For example, if projection by the projector module 6 is commanded in advance (switch ON), then projection may be performed for a predetermined time period (for example one minute) when the power supply to the portable telephone device with incorporated projector 10 is turned on. By doing this, it is possible to check upon the projection image whether or not any newly arrived email is present.

Although in the explanation above the discussion was made, by way of example, in terms of a case in which the contents of a received email are projected by the projector module 6, it would also be possible to apply the present invention to a case in which, instead of an email, the contents of a web page which has been consulted are projected.

Although the portable telephone device with incorporated projector 10 has been explained, by way of example, as an example of an electronic device, a PDA or the like which is endowed with a display function for displaying email or the contents of a web page which has been consulted, and a projection function for projection thereof, would also be acceptable.

Although the details of various embodiments have been explained in the above description, the present invention is not to be considered as being limited by the contents thereof. Other modes which are considered to lie within the range of the technical concept of the present invention are also included within its scope.

The content of the disclosure of the following application upon which priority right is claimed is hereby incorporated by reference:

Japanese Patent Application 2004-273434 (filed Sep. 21, 2004).

The invention claimed is:

1. An electronic device, comprising:
a projector device that projects a first text image according to text data, the first text image including a first predetermined number of characters in a direction in which a text runs and the text data including a plurality of characters;
a display device disposed on a surface of a body, the display device displaying a second text image according to the text data, the second text image including a second predetermined number of characters in the direction in which the text runs; and
a projection control unit that controls the projector device to project the first text image while the display device is displaying the second text image, wherein:
when a number of the plurality of characters included in the text data is greater than a third predetermined number of characters, the projection control unit controls the projector device so that the first predetermined number of characters is greater than the second predetermined number of characters.

2. An electronic device according to claim 1, wherein:
a projection resolution of the projector device is higher than a display resolution of the display device.

3. An electronic device according to claim 1, wherein:
the projection control unit determines a number of characters permitted and a character size permitted for the first text image according to the number of the plurality of characters included in the text data, and controls the projector device to project the first text image having the number of characters and the character size that have been determined.

4. An electronic device according to claim 3, wherein:
the projection control unit determines an upper limit to the number of characters permitted, and;
if the number of the plurality of characters in the text data is greater than the upper limit, the projection control unit controls the projector device to project the first text image having the upper limit number of characters and the character size corresponding to the upper limit, and to scroll text of the first text image.

5. An electronic device, comprising:
a projector device that projects a first image according to data for projection;
a display device disposed on a surface of a body, the display device displaying a second image according to data for display;
a receiving unit that receives an email, the email including text information and an attached file; and
a control unit that, according to a projection command, generates the data for display representing a text from the text information and the data for projection from file information of the attached file, and controls the projector device to project the first image according to the data for projection generated from the file information, while the display device displays the second image according to the data for display generated from the text information.

6. An electronic device according to claim 5, further comprising:
a changeover control unit that, according to a changeover command, sends a command to the control unit so as to generate the data for display from the file information of the attached file and the data for projection representing the text from the text information and to control the projector device to project the first image according to the data for projection generated from the text information, while the display device displays the data for display generated from the file information.

7. An electronic device, comprising:
a receiving unit that receives an email, the email including text information and additional information other than the text information,
a projector device that projects a first image according to data for projection;
a display device disposed on a surface of a body, the display device displaying a second image according to data for display; and
a control unit that, according to a projection command, generates the data for projection from the text information included in the received email and the data for display representing a list of the received emails from the additional information, and controls the projector device to project the first image representing the text of the received email selected among the list of the received emails that is being displayed on the display device while the display device displays the second image representing the list of the received emails.

8. An electronic device according to claim 2, wherein:
the projection control unit determines a number of characters permitted and a character size permitted for the first text image according to the number of the plurality of characters included in the text data, and controls the projector device to project the first text image having the number of characters and the character size that have been determined.

9. An electronic device according to claim 8, wherein:
the projection control unit determines an upper limit to the number of characters permitted, and;
if the number of the plurality of characters in the text data is greater than the upper limit, the projection control unit controls the projection device to project the first text image having the upper limit number of characters and the character size corresponding to the upper limit, and to scroll text of the first text image.

* * * * *